United States Patent
Fan et al.

(10) Patent No.: US 12,461,367 B2
(45) Date of Patent: Nov. 4, 2025

(54) NEAR-EYE DISPLAY WAVEGUIDE DEVICE AND NEAR-EYE DISPLAY APPARATUS

(71) Applicant: JIAXING UPHOTON OPTOELECTRONICS TECHNOLOGY CO., LTD., Jiaxing (CN)

(72) Inventors: Zhentao Fan, Jiaxing (CN); Lei Sui, Jiaxing (CN); Kehan Tian, Jiaxing (CN)

(73) Assignee: JIAXING UPHOTON OPTOELECTRONICS TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 19/045,050

(22) Filed: Feb. 4, 2025

(65) Prior Publication Data

US 2025/0251594 A1    Aug. 7, 2025

(30) Foreign Application Priority Data

Feb. 5, 2024  (CN) .......................... 202410166431.9

(51) Int. Cl.
| | |
|---|---|
| *G02B 27/01* | (2006.01) |
| *G02B 5/18* | (2006.01) |
| *G03H 1/00* | (2006.01) |
| *G06F 3/01* | (2006.01) |

(52) U.S. Cl.
CPC ....... *G02B 27/0101* (2013.01); *G02B 5/1866* (2013.01)

(58) Field of Classification Search
CPC .......................... G02B 27/0101; G02B 5/1866
USPC .......................................................... 359/630
See application file for complete search history.

(56) References Cited

U.S. PATENT DOCUMENTS 11,156,832 B1    10/2021    Keith et al.

FOREIGN PATENT DOCUMENTS

| CN | 110462487 A | 11/2019 |
|---|---|---|
| CN | 114286962 A | 4/2022 |
| WO | 2024015217 A1 | 1/2024 |

OTHER PUBLICATIONS

Second Office Action issued in Chinese Application No. 202410166431.9; mailed Aug. 19, 2024; 18 pgs.
Notice to Grant issued in Chinese Application No. 202410166431.9; mailed Nov. 13, 2024; 3 pgs.

*Primary Examiner* — Bumsuk Won
*Assistant Examiner* — Grant A Gagnon
(74) *Attorney, Agent, or Firm* — HAUPTMAN HAM, LLP

(57) ABSTRACT

A near-eye display waveguide device and a near-eye display apparatus are disclosed. The waveguide device comprises m waveguide substrates stacked on each other, m being an integer and m≥3. The device receives image-carrying light with an image field of view angle range, and the image-carrying light comprises light with less than m dominant wavelengths. Corresponding to each dominant wavelength, the m waveguide substrates are formed with at least two coupling-in gratings, the at least two coupling-in gratings are formed on different substrates and have different grating periods, for coupling light in different coupling-in field of view angle ranges into corresponding substrates, the coupling-in field of view angle ranges are each smaller than the image field of view angle range, and the coupling-in field of view angle ranges cover the image field of view angle range as a whole.

12 Claims, 6 Drawing Sheets

NEAR-EYE DISPLAY WAVEGUIDE DEVICE AND NEAR-EYE DISPLAY APPARATUS

RELATED APPLICATIONS

The present application claims priority from Chinese Application Number 202410166431.9 filed on Feb. 5, 2024, the disclosure of which is hereby incorporated by reference herein in its entirety.

TECHNICAL FIELD

The present disclosure relates to near-eye display technology, particularly a near-eye display waveguide device and a near-eye display apparatus having the waveguide device.

BACKGROUND

With the development of science and technology, AR (Augmented Reality) display technology is slowly becoming popular as a brilliant and portable display technology. Its main feature is to superimpose virtual images on real scenes, allowing people to watch virtual images while also watching real scenes. Diffractive optical waveguide devices have been widely used in AR displays. Diffractive optical waveguides have the advantages of being light, thin, having strong pupil expansion ability, and easy mass production, and they have become the core components of AR display devices.

With the gradual development of diffractive optical waveguide technology, people have put forward higher and higher requirements for its color uniformity and field of view. In order to expand the field of view and achieve full color, people have proposed a solution of using three waveguide substrates, as shown in FIG. 1, in which three waveguide substrates Wr, Wg, and Wb are used for displaying images of red, green, and blue colors, respectively, and each of the waveguide substrates Wr, Wg, and Wb is formed with a coupling-in grating 1 for coupling light of the corresponding color into the waveguide substrate and a coupling-out grating 2 for expanding the pupil and coupling the light out of the waveguide substrate to achieve image display; the light of different colors overlap on each other after being coupled out by the coupling-out grating 2, so that the human eye E can observe a color image. However, in the existing technical solutions, the colors between different waveguide substrates are often prone to crosstalk, resulting in poor color uniformity. In addition, the field of view that can be displayed is limited by the refractive index of the waveguide substrate and the grating parameters of the coupling-in grating and the coupling-out grating formed thereon, which cannot meet the increasing display needs.

SUMMARY

The object of the present disclosure is to provide a near-eye display waveguide device and a near-eye display apparatus having the waveguide device, which at least partially overcome the above-mentioned problems in the prior art.

According to one aspect of the present disclosure, a near-eye display waveguide device is provided, which comprises m waveguide substrates stacked on each other, m is an integer and m>3, the near-eye display waveguide device receiving image-carrying light with an image field of view angle range, and the image-carrying light comprising light of less than m dominant wavelengths, wherein:

corresponding to each dominant wavelength, the m waveguide substrates are formed with at least two coupling-in gratings, the at least two coupling-in gratings are formed on different waveguide substrates and have different grating periods, for being used to couple light in different coupling-in field of view angle ranges into corresponding waveguide substrates, wherein the coupling-in field of view angle ranges are each smaller than the image field of view angle range, and the coupling-in field of view angle range as a whole covers the image field of view angle range.

Advantageously, each waveguide substrate is formed with a coupling-out grating and at least one coupling-in grating; after being coupled into a waveguide substrate through a corresponding coupling-in grating, the image-carrying light of each dominant wavelength propagates to the coupling-out grating of the waveguide substrate through a total reflection path corresponding to the coupling-in grating; and a total reflection path corresponding to a coupling-in grating for coupling light of one dominant wavelength does not pass through a coupling-in grating for coupling light of another dominant wavelength.

Advantageously, the coupling-in gratings formed on the m waveguide substrates have the same grating vector direction; and the coupling-in gratings formed on the m waveguide substrates for coupling light of different dominant wavelengths are separated from each other in a direction parallel to each waveguide substrate and perpendicular to the grating vector direction.

Advantageously, the coupling-in gratings formed on the same waveguide substrate have the same grating vector direction and grating period and are arranged at substantially the same orientation relative to the coupling-out gratings on the waveguide substrate; or the coupling-in gratings formed on the same waveguide substrate have different grating vector directions and/or grating periods and are arranged at different orientations relative to the coupling-out gratings on the waveguide substrate.

Advantageously, the coupling-in gratings formed on the same waveguide substrate for coupling light of different dominant wavelengths have different grating structure features, and the grating structure features comprise one or more of depth, height, duty cycle, blaze angle, and optical coating of the gratings.

Advantageously, the projections of at least two coupling-in gratings formed on different waveguide substrates for coupling light of the same dominant wavelength overlap each other in a direction perpendicular to the waveguide substrate.

Advantageously, at least two coupling-in gratings are formed on adjacent waveguide substrates.

Advantageously, the m waveguide substrates are waveguide substrates $W_i$, i is an integer and $1 \leq i \leq m$, wherein, for i=1, a coupling-in grating $G_{(1,1)}$ for a dominant wavelength $\lambda_1$ is formed on a waveguide substrate $W_1$, and a coupling-in grating $G_{(1,1)}$ has a grating period $d_1$;

for i=m, a coupling-in grating $G_{(m-1,2)}$ for a dominant wavelength $\lambda_{m-1}$ is formed on a waveguide substrate $W_m$, and the coupling-in grating $G_{(m-1,2)}$ has a grating period $d_m$;

for $2 \leq i \leq m-1$, a coupling-in grating $G_{(i,1)}$ for a dominant wavelength $\lambda_i$ and a coupling-in grating $G_{(i-1,2)}$ for the dominant wavelength $\lambda_{i-1}$ are formed on the waveguide substrate $W_i$, and satisfy: $\lambda_{i-1} > \lambda_i > \lambda_{i+1}$.

Advantageously, for 2≤i≤m−1, the coupling-in grating $G_{(i,1)}$ and the coupling-in grating $G_{(i-1,2)}$ have the same grating vector direction and grating period $d_i$, and $d_{i-1} > d_i > d_{i+1}$.

Advantageously, m=4, and the image-carrying light comprises red, green, and blue light.

Advantageously, the m waveguide substrates are made of materials with the same or similar refractive index.

Advantageously, for 1≤i≤m−1: $\lambda_r/d_i$ is approximately a constant $C_1$, and/or $\lambda_r/d_{i+1}$ is approximately a constant $C_2$, wherein a deviation is within ±5%.

Advantageously, for 2≤i≤m−1, the coupling-in grating $G_{(i,1)}$ and the coupling-in grating $G_{(i-1,2)}$ have different grating structure features, and the grating structure features comprise one or more of depth, height, duty cycle, blaze angle and optical coating of the gratings.

Advantageously, for 1≤i≤m−1, j is an integer and 1≤j≤m−1, k=1 or 2, and i≠j, a coupling-in grating $G_{(i,k)}$ and a coupling-in grating $G_{(j,k)}$ are separated from each other in a direction perpendicular to the waveguide substrates.

Advantageously, for 1≤i≤m−1, the projections of the coupling-in grating $G_{(i,1)}$ and the coupling-in grating $G_{(i,2)}$ overlap each other in a direction perpendicular to the waveguide substrates.

Advantageously, the coupling-in grating $G_{(i,1)}$ and the coupling-in grating $G_{(i,2)}$ are formed on adjacent waveguide substrates.

According to another aspect of the present disclosure, a near-eye display apparatus is provided, comprising the near-eye display waveguide device as described above.

Advantageously, the near-eye display apparatus further comprises a lens and a frame for holding the lens close to the eye, and the lens comprises the near-eye display waveguide device.

In the near-eye display waveguide device according to embodiments of the present disclosure, corresponding to each dominant wavelength, at least two coupling-in gratings with different grating periods formed on different waveguide substrates are provided to couple light in different coupling-in field of view angle ranges into the corresponding waveguide substrate for image display, thereby expanding the field of view angle range of the near-eye display as a whole.

In addition, according to the embodiment of the present disclosure, by designing the relative position relationship of the coupling-in gratings for different dominant wavelengths in the projection in the direction perpendicular to the waveguide substrate, color crosstalk can be avoided and color uniformity can be improved.

BRIEF DESCRIPTION OF THE DRAWINGS

Other features, objects, and advantages of the present disclosure will become more apparent by reading the following detailed description of non-limitative embodiments with reference to the following drawings.

DETAILED DESCRIPTION

Figure 1:
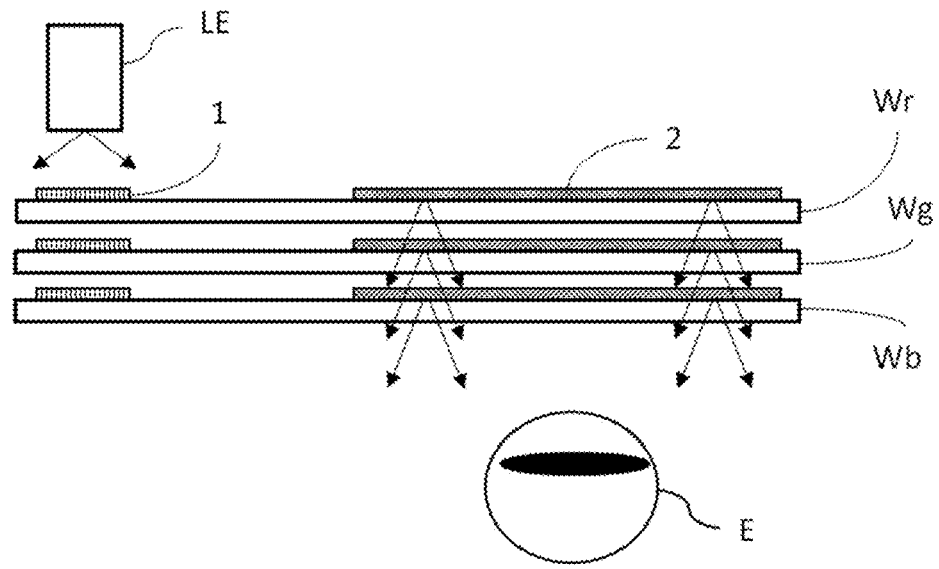
FIG. 1 is a schematic diagram of a waveguide device for realizing full-color display in the prior art.

The present disclosure will be further described in detail in conjunction with drawings and embodiments. It should be understood that the specific embodiments described herein are only used to explain the related disclosure, but not to limit the disclosure. For the convenience of description, only the parts related to the disclosure are shown in the drawings. It should be noted that the embodiments in the present application and the features of the embodiments can be combined with each other without conflict.

Figure 2:
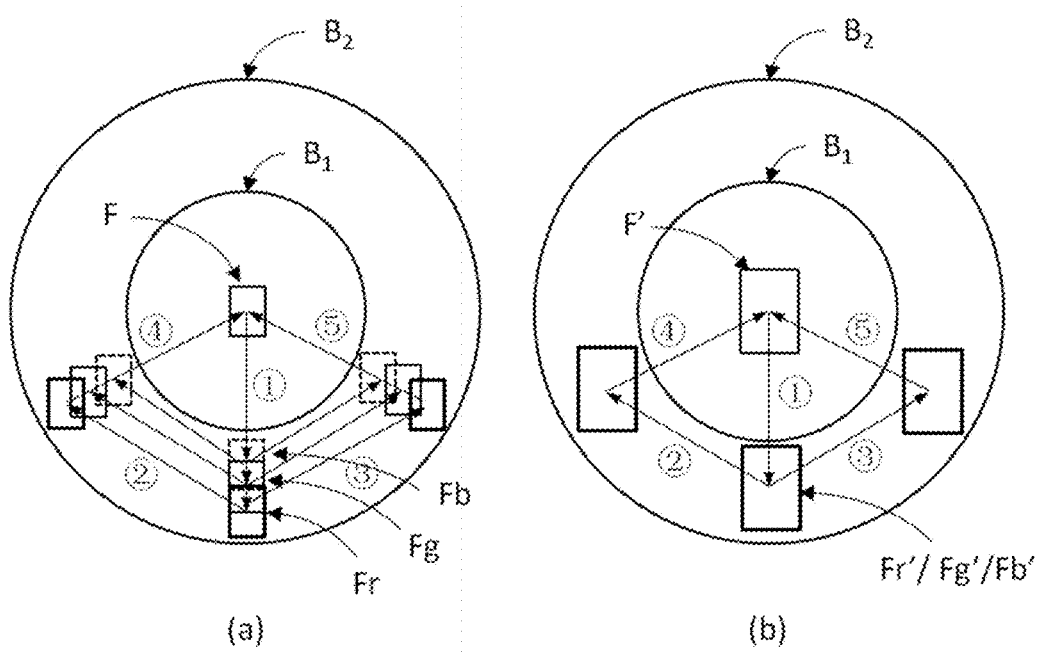
FIG. 2 is a wave vector space graph of a waveguide device for realizing full-color display based on a single waveguide substrate and a wave vector space graph of the waveguide device shown in FIG. 1.

In order to better illustrate the inventive concept of the present disclosure, firstly, referring to FIG. 2, the field of view angle range that can be supported by the diffractive optical waveguide is analyzed by analyzing light beam wave vector space.

Graph (a) in FIG. 2 shows a wave vector space graph of a waveguide device that realizes full-color display based on a single waveguide substrate in the prior art, and Graph (b) in FIG. 2 shows a wave vector space graph of a waveguide device of FIG. 1 that realizes full-color display based on three waveguide substrates corresponding to three colors of red, green and blue.

In the wave vector space shown in FIG. 2, $B_1$ represents a first wave vector boundary formed by satisfying the total internal reflection condition in the waveguide device, and the first wave vector boundary $B_1$ can be normalized to a circle with a radius of 1; and $B_2$ represents a second wave vector boundary corresponding to a maximum wave vector that can be transmitted in the waveguide device, and the second wave vector boundary $B_2$ is determined by the refractive index of the waveguide substrate. Light beam can be transmitted in the waveguide device only when a light beam wave vector is in an annular space between the first wave vector boundary $B_1$ and the second wave vector boundary $B_2$. If the light beam wave vector is within the first wave vector boundary $B_1$, the light will leak out of the waveguide substrate; and if the light beam wave vector is outside the second wave vector boundary $B_2$, the diffraction order does not exist and the corresponding image-carrying light cannot be transmitted.

FIG. 2 shows angle spectra F and F' of the image-carrying light, the coupling-in effect of the coupling-in grating on the light beam (see the mark "①" in FIG. 2), the pupil expansion effect of the waveguide device on the light beam (see the marks "②" and "③" in FIG. 2), and the coupling-out effect of the coupling-out grating on the light beam (see the marks "④" and "⑤" in FIG. 2), and also shows the angle spectrum range (corresponding to the field of view angle range) Fr, Fg, Fb and Fr', Fg', Fb' of the light beam that the waveguide device can transmit.

As shown in Graph (a) of FIG. 2, for example, for a full-color light beam comprising red, green, and blue light, due to the dispersion effect of the coupling-in grating, the angle spectra (corresponding to the field of view angle range) Fr, Fg, Fb of the red, green and blue light beams are offset in the available annular space between the first boundary $B_1$ and the second boundary $B_2$. This dispersion effect results in the angle spectra Fr, Fg, Fb of the full-color light beam that can be transmitted by the waveguide substrate in the waveguide device that realizes full-color display based on the single waveguide substrate (see Graph (a) in FIG. 2) to be significantly smaller than the angle spectra Fr', Fg', Fb' of the monochromatic light beam that can be transmitted by each waveguide substrate in the waveguide device that realizes full-color display based on three waveguide substrates corresponding to the three colors of red, green and blue (see Graph (b) in FIG. 2).

The width of the annular space between the first boundary $B_1$ and the second boundary $B_2$ in the wave vector space shown in FIG. 2 is mainly determined and limited by the refractive index of the waveguide substrate, and the angle spectrum range (corresponding to the field of view angle range) of the light beam that the waveguide device can support for transmission is limited by the width of the annular space. For example, roughly calculated, a single glass substrate with a refractive index of 1.9 only supports full-color light beam transmission with a 30° diagonal field of view, and when three glass substrates with a refractive index of 1.9 are used to realize the display of red, green, and blue colors respectively, it yet only supports a 65° diagonal field of view; a single glass substrate with a refractive index of 1.7 only supports full-color light beam transmission with a 20° diagonal field of view, and when three glass substrates with a refractive index of 1.7 are used to realize the display of red, green, and blue colors respectively, it yet only supports a 42° diagonal field of view.

The present disclosure proposes a near-eye display waveguide device, which comprises m (m≥3) waveguide substrates stacked on each other, the near-eye display waveguide device receiving image-carrying light with an image field of view angle range, the image-carrying light comprising light of several dominant wavelengths, and the number of the dominant wavelengths being less than the number of waveguide substrates, wherein corresponding to each dominant wavelength, at least two coupling-in gratings are formed in the m waveguide substrates, the at least two coupling-in gratings are formed on different waveguide substrates, and have different grating periods, for coupling light in different coupling-in field of view angle ranges into the corresponding waveguide substrates, wherein the coupling-in field of view angle ranges are each smaller than the image field of view angle range, and the coupling-in field of view angle range as a whole covers the image field of view angle range.

In this application, "dominant wavelength" is intended to mean a wavelength range with a certain bandwidth and having a center wavelength with a specific value of the "dominant wavelength".

The present disclosure is proposed to overcome the limitation of the refractive index of the waveguide substrate on the angle spectrum of the transmitted light beam, and the present disclosure is based on a discovery that the angle spectrum range of the light beam transmitted in different waveguide substrates can be biased by changing the ratio of the wavelength of the light beam to the grating period of the coupling-in grating so that the limitation of the refractive index of the waveguide substrate on the angle spectrum range of the transmitted light beam can be overcome by combining more than two waveguide substrates and making the gratings on different waveguide substrates have different wavelength/period ratios. In the near-eye display waveguide device according to the embodiment of the present invention, each color of light is transmitted through at least two waveguide substrates, and the corresponding coupling-in gratings have different grating periods, thereby greatly improving the field of view angle of the full-color display.

An embodiment of a near-eye display waveguide device according to embodiments of the present invention will be described in detail below with reference to the accompanying drawings.

Figure 3:
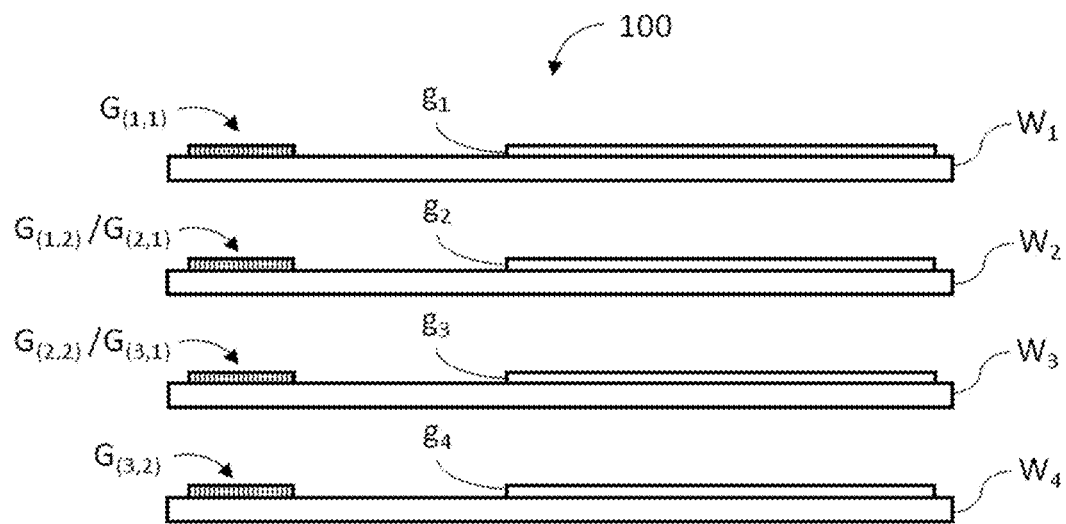
FIG. 3 is a side view of an example of a near-eye display waveguide device according to embodiments of the present disclosure.
Figure 4:
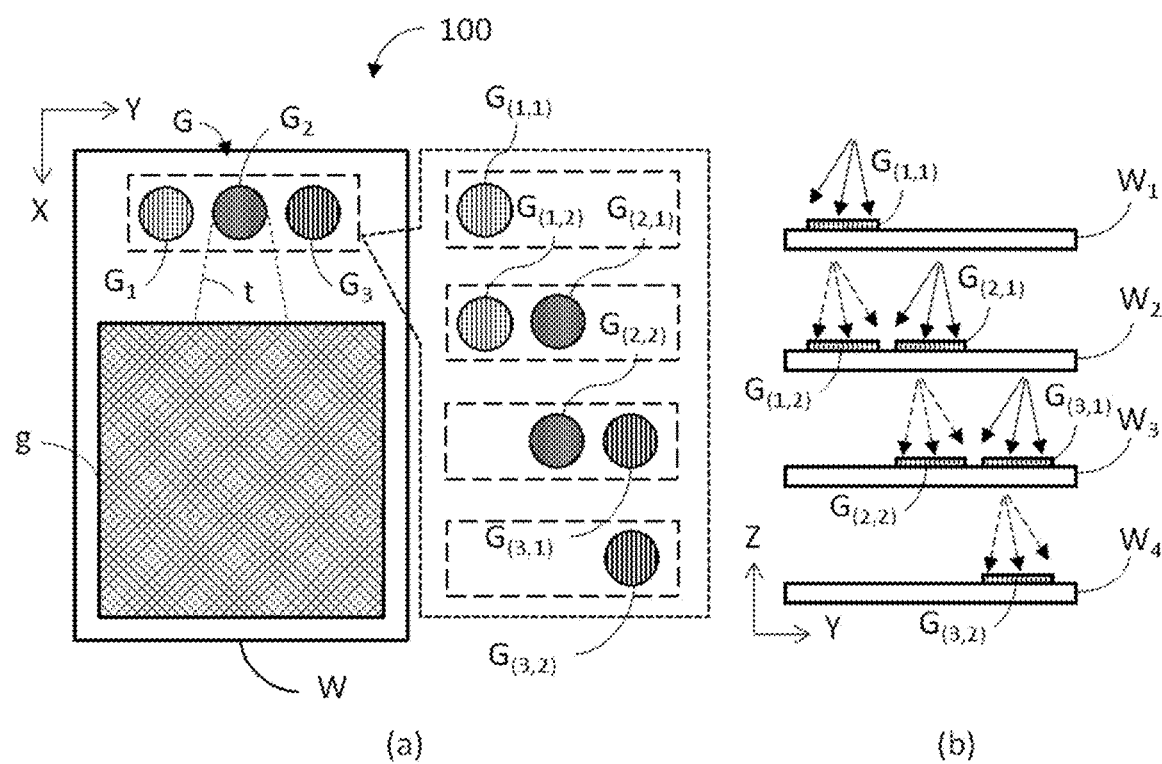
FIG. 4 is a top view and another side view of the near-eye display waveguide device shown in FIG. 3, schematically showing an arrangement of coupling-in gratings.

FIG. 3 shows an example of a near-eye display waveguide device according to embodiments of the present invention in a side view, namely, a near-eye display waveguide device 100. In FIG. 4, Graph (a) is a top view of the near-eye display waveguide device 100 observed from a plane perpendicular to a waveguide substrate, and Graph (b) is a side view of the near-eye display waveguide device 100 observed along X direction shown in Graph (a).

In the examples shown in FIG. 3 and FIG. 4, the near-eye display waveguide device 100 is used to receive image-carrying light comprising three dominant wavelengths $\lambda_1$, $\lambda_2$, and $\lambda_3$, and perform near-eye image display. For example, the image-carrying light comprises red light, green light, and blue light. As more clearly shown in FIG. 3, the near-eye display waveguide device 100 comprises four waveguide substrates $W_1$, $W_2$, $W_3$, and $W_4$ stacked on each other.

According to the embodiment of the present invention, in the near-eye display waveguide device 100, the dominant wavelength $\lambda_1 > \lambda_2 > \lambda_3$, and as shown in FIG. 3 and FIG. 4, a coupling-in grating $G_{(1,n)}$ for the dominant wavelength $\lambda_1$ is formed on the waveguide substrate $W_1$; a coupling-in grating $G_{(2,1)}$ for the dominant wavelength $\lambda_2$ and a coupling-in grating $G_{(1,2)}$ for the dominant wavelength $\lambda_1$ are formed on the waveguide substrate $W_2$; a coupling-in grating $G_{(3,1)}$ for the dominant wavelength $\lambda_3$ and a coupling-in grating $G_{(2,2)}$ for the dominant wavelength $\lambda_2$ are formed on the waveguide substrate $W_3$; and a coupling-in grating $G_{(3,2)}$ for the dominant wavelength $\lambda_3$ is formed on the waveguide substrate $W_4$. These coupling-in gratings are also collectively referred to as "coupling-in gratings G" hereinafter.

According to the embodiment of the present invention, the coupling-in gratings for the same dominant wavelength formed on different waveguide substrates have different grating periods. Therefore, although not shown in FIG. 3 and FIG. 4, the near-eye display waveguide device 100 also has the following features, that is, the coupling-in grating $G_{(1,1)}$ and the coupling-in grating $G_{(1,2)}$ (hereinafter collectively referred to as "coupling-in grating $G_1$") for the dominant wavelength $\lambda_1$ have different grating periods, the coupling-in grating $G_{(2,1)}$ and the coupling-in grating $G_{(2,2)}$ (hereinafter collectively referred to as "coupling-in grating $G_2$") for the dominant wavelength $\lambda_2$ have different grating periods, and the coupling-in grating $G_{(3,1)}$ and the coupling-in grating $G_{(3,2)}$ (hereinafter collectively referred to as "coupling-in grating $G_3$") for the dominant wavelength $\lambda_3$ have different grating periods.

Figure 5:
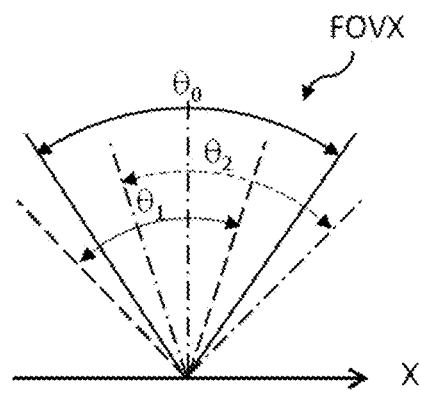
FIG. 5 schematically shows an exemplary relationship between the coupling-in field of view angle ranges of two coupling-in gratings for the same dominant wavelength in a near-eye display waveguide device according to some embodiments of the present disclosure and the image field of view angle range of the image-carrying light projected by a light engin.

FIG. 5 schematically shows an exemplary relationship between the coupling-in field of view angle range of two coupling-in gratings for the same dominant wavelength in a near-eye display waveguide device according to some embodiments of the present disclosure and the image field of view angle range of the image-carrying light projected by a light engin. The near-eye display waveguide device 100 shown in FIGS. 3 and 4 is configured such that the coupling-in field of view angle ranges $\theta_1$ and $\theta_2$ of two coupling-in gratings (such as coupling-in gratings $G_{(1,n)}$ and $G_{(1,2)}$ for the same dominant wavelength and the image field of view angle range $\theta_0$ of the image-carrying light projected by the light engin conform to the relationship schematically shown in FIG. 5, that is, the coupling-in field of view angle ranges $\theta_1$ and $\theta_2$ are each smaller than the image field of view angle range $\theta_0$, but cover the image field of view angle range $\theta_0$ as a whole.

It can be seen that the near-eye display waveguide device 100 adopts a 4-piece waveguide substrate configuration, and the configuration of the coupling-in gratings allows each color of light to be transmitted through two waveguide substrates, and the corresponding coupling-in gratings have different grating periods so that the coupling-in field of view angle ranges $\theta_1$ and $\theta_2$ are offset relative to each other, thereby achieving a larger coverage of the image field of view angle range $\theta_0$.

Figure 6:
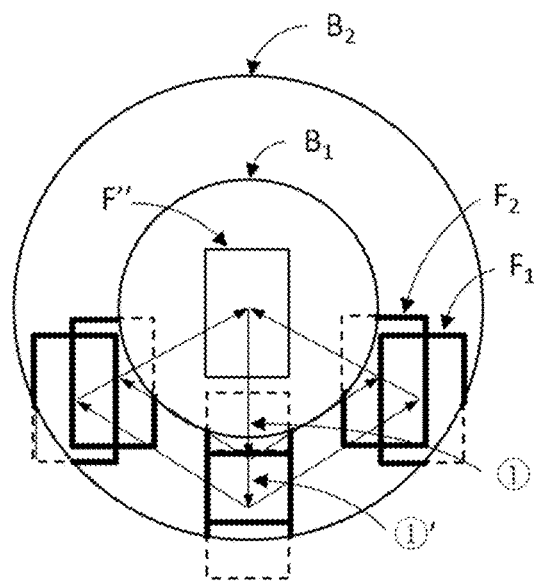
FIG. 6 is a wave vector space graph of a near-eye display waveguide device according to some embodiments of the present disclosure.

In order to better illustrate the technical advantages of the near-eye display waveguide device according to the embodiment of the present disclosure in expanding the field of view angle range, FIG. 6 further shows a wave vector space graph of a near-eye display waveguide device according to some embodiments of the present disclosure. For clarity, FIG. 6 only shows a wave vector space graph for a light beam of a single dominant wavelength.

Taking the near-eye display waveguide device 100 and the dominant wavelength $\lambda_1$ as an example, FIG. 6 shows an angle spectrum F‴ of the image-carrying light, shows coupling-in, pupil expansion and coupling-out effects of the coupling-in grating $G_{(1,1)}$ on the light beam (the mark "①" in FIG. 6 represents the coupling-in effect of the coupling-in grating $G_{(1,1)}$ on the light beam, and the mark "①'" represents the coupling-in effect of the coupling-in grating $G_{(1,2)}$ on the light beam), and also shows the angle spectrum range of the light beam that can be transmitted by the waveguide device (corresponding to the field of view angle range) $F_1$, $F_2$. It can be seen that although the coupling-in grating $G_{(1,1)}$ and the coupling-in grating $G_{(1,2)}$ can not completely couple the image-carrying light with the angle spectrum F‴ into the corresponding waveguide substrates $W_1$, $W_2$, the angle spectra $F_1$ and $F_2$ of the image-carrying light that they can couple can "piece together" the complete angle spectrum F. That is to say, the coupling-in gratings $G_{(1,1)}$ and the coupling-in gratings $G_{(1,2)}$ respectively formed on the waveguide substrates $W_i$ and $W_2$ can realize image display in the field of view angle range corresponding to the angle spectrum F‴. Comparing the wave vector space graph shown in FIG. 2, it can be seen that the near-eye display waveguide device according to the embodiment of the present invention breaks through the limitation of the refractive index of the waveguide substrate on the angle spectrum range of the transmitted light beam.

In the near-eye display waveguide device according to the embodiment of the present invention, each color of light is transmitted through at least two waveguide substrates, and the corresponding coupling-in gratings have different grating periods, thereby greatly improving the field of view of the full-color display.

Returning to FIG. 3, each waveguide substrate $W_1$, $W_2$, $W_3$, and $W_4$ (hereinafter also collectively referred to as "waveguide substrate W") can be formed with a coupling-out grating $g_1$, $g_2$, $g_3$, and $g_4$ (hereinafter also collectively referred to as "coupling-out grating g") and at least one coupling-in grating G as described above. FIG. 4 schematically shows an exemplary arrangement of the coupling-in grating G of the near-eye display waveguide device 100, wherein a plurality of waveguide substrates W stacked on each other and the coupling-in grating G and the coupling-out grating g formed thereon are shown in a manner that their projections on the top surface (located in the X-Y plane) of the waveguide device in a direction perpendicular to the waveguide substrates are stacked on each other on the left side of the top view of Graph (a), and the arrangement of the coupling-in gratings on the waveguide substrates $W_1$, $W_2$, $W_3$, and $W_4$ is shown in sequence from top to bottom on the right side; and Graph (b) further shows the arrangement of the coupling-in gratings in a side view observed along the X direction.

After being coupled into the waveguide substrate through the corresponding coupling-in grating, the image-carrying light of each dominant wavelength propagates to the coupling-out grating of the waveguide substrate through a total reflection path corresponding to the coupling-in grating. For example, in the near-eye display waveguide device 100 shown in FIG. 4, the image-carrying light of the dominant wavelength $\lambda_2$ is coupled into the waveguide substrate $W_2$ through the coupling-in grating $G_{(2,1)}$ and then propagated to the coupling-out grating $g_2$ on the waveguide substrate $W_2$ through a total reflection path t; the situation is the same for other coupling-in gratings G and will not be described here. For the sake of clarity and simplicity, FIG. 4 only shows the total reflection path t corresponding to the coupling-in grating $G_2$. Advantageously, the total reflection path corresponding to the coupling-in grating for coupling in light of one dominant wavelength does not pass through the coupling-in grating for coupling in light of another dominant wavelength. This helps to avoid the loss of reflection efficiency caused by the light propagating along the total reflection path passing through the grating area. In the near-eye display waveguide device 100, from the projection in the direction perpendicular to the waveguide substrate (Z direction), the total reflection path t corresponding to the coupling-in grating $G_2$ for the dominant wavelength $\lambda_2$ does not pass through the coupling-in grating $G_1$ for the dominant wavelength $\lambda_1$ and the coupling-in grating $G_3$ for the dominant wavelength $\lambda_3$; the situation is the same for the total reflection paths of the coupling gratings $G_1$ and $G_3$, as shown in Graph (a) in FIG. 4.

According to embodiments of the present disclosure, optionally, the projections of the coupling-in gratings for coupling light of the same dominant wavelength formed on different waveguide substrates in a direction perpendicular to the waveguide substrate overlap each other. In this way, the light of the dominant wavelength with an image field of view angle range $\theta_0$ from the same light engin LE can be sequentially irradiated onto the coupling-in gratings with different coupling field of view angle ranges $\theta_1$ and $\theta_2$, thereby simplifying the light engin configuration and improving the efficiency of light utilization. Advantageously, the coupling-in gratings for the same dominant wavelength can be formed on adjacent waveguide substrates.

For example, in the example shown in FIG. 4, the coupling-in grating $G_{(1,1)}$ and the coupling-in grating $G_{(1,2)}$ for the dominant wavelength $\lambda_1$ are respectively formed on adjacent waveguide substrates $W_1$ and $W_2$, and their projections in the Z direction perpendicular to the waveguide substrates overlap with each other, so that only a single projection of the coupling-in grating $G_1$ is shown in the left Graph (a) of FIG. 4; similarly, the coupling-in grating $G_{(2,1)}$ and the coupling-in grating $G_{(2,2)}$ for the dominant wavelength $\lambda_2$ are respectively formed on adjacent waveguide substrates $W_2$ and $W_3$, and their projections in the Z direction overlap with each other, so that only a single projection of the coupling-in grating $G_2$ is shown in the left Graph (a) of FIG. 4; the coupling-in grating $G_{(3,1)}$ and the coupling-in grating $G_{(3,2)}$ for the dominant wavelength $\lambda_3$ are respectively formed on adjacent waveguide substrates $W_3$ and $W_4$, and their projections in the Z direction overlap with each other, so that only a single projection of the coupling-in grating $G_3$ is shown in the left Graph (a) of FIG. 4.

According to embodiments of the present disclosure, optionally, the coupling-in gratings formed on the plurality of waveguide substrates have the same grating vector direction; and the coupling-in gratings formed on the plurality of waveguide substrates for coupling light of different dominant wavelengths are separated from each other in a direction parallel to each of the waveguide substrates and perpendicular to the grating vector direction. Since in the diffraction light waveguide, the light coupled into the waveguide substrate via the coupling-in grating propagates toward the coupling-out grating substantially along the grating vector direction of the coupling-in grating, this structure is conducive to avoiding the loss of reflection efficiency caused by the light passing through the grating area during the propagation from the coupling-in grating to the coupling-out grating, and even causing problems such as image ghosting.

For example, as shown in FIG. 4, each coupling-in grating G formed on the waveguide substrates $W_1$, $W_2$, $W_3$, and $W_4$ has the same grating vector direction (X direction shown in FIG. 4), and the coupling-in gratings $G_1$, $G_2$, $G_3$ formed on the waveguide substrates $W_1$, $W_2$, $W_3$, and $W_4$, which are used to couple the light of different dominant wavelengths $\lambda_1$, $\lambda_2$, and $\lambda_3$ are separated from each other in the Y direction.

Advantageously, a through hole can be formed on a waveguide substrate at a position perpendicular to the waveguide substrate facing the coupling-in grating on the waveguide substrate below it, so that the image-carrying light passes through. This is conducive to reducing light loss.

In addition, according to embodiments of the present invention, the coupling-in gratings formed on the same waveguide substrate can have the same grating vector direction and grating period and can be set at substantially the same orientation relative to the coupling-out grating on the waveguide substrate. In this way, it is conducive to simplifying the grating design and the configuration of the light engin used in conjunction with the waveguide device.

Figure 7:
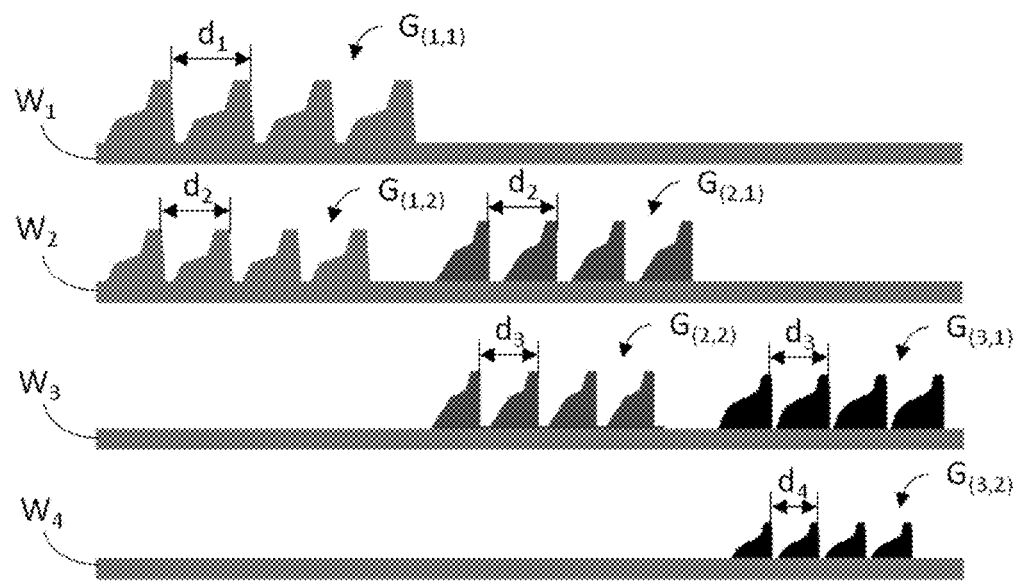
FIG. 7 schematically shows an example of a grating structure of each coupling-in grating of the near-eye display device shown in FIG. 3 and FIG. 4.

For example, as shown in FIG. 4, each coupling-in grating G formed on the waveguide substrates $W_1$, $W_2$, $W_3$, and $W_4$ can have the same grating vector direction (the X direction shown in FIG. 4) and are located upstream along the X direction relative to the coupling-out grating g, and the coupling-in grating G formed on the waveguide substrates $W_1$, $W_2$, $W_3$, and $W_4$ can have grating periods $d_1$, $d_2$, $d_3$ and $d_4$, respectively (see FIG. 7). In particular, the coupling-in gratings $G_{(1,2)}$ and $G_{(2,1)}$ formed on the waveguide substrate $W_2$ have the same grating period $d_2$; the coupling-in gratings $G_{(2,2)}$ and $G_{(3,1)}$ formed on the waveguide substrate $W_3$ have the same grating period $d_3$.

In the near-eye display waveguide device 100, preferably, in the case of the dominant wavelength $\lambda_1 > \lambda_2 > \lambda_3$, the grating period satisfies $d_1 > d_2 > d_3 > d_4$. In addition, each waveguide substrate is preferably made of a material with the same or similar refractive index. In some cases, this can be achieved by using the same material to make each waveguide substrate. More preferably, $\lambda_1/d_1$, $\lambda_2/d_2$, and $\lambda_3/d_3$ are approximately equal and approximately a constant $C_1$, and/or $\lambda_1/d_2$, $\lambda_2/d_3$, and $\lambda_3/d_4$ are approximately equal and approximately a constant $C_2$, with a deviation of within ±5%, more preferably within ±1%. This allows substantially the same field of view boundary to be provided for the light of different dominant wavelengths, thereby maximizing the use of the available annular wave vector space limited by the refractive index of the waveguide substrate and greatly simplifying the design of the near-eye display waveguide device.

In addition, FIG. 7 schematically shows an example of grating structures of the coupling-in gratings of the near-eye display device 100. According to the embodiment of the present disclosure, advantageously, the coupling-in gratings formed on the same waveguide substrate for coupling light of different dominant wavelengths have different grating structure features. Here, the grating structure features comprise one or more of the depth, height, duty cycle, blaze angle, and optical coating of the gratings. For example, as shown in FIG. 7, the coupling-in gratings $G_{(1,2)}$ and $G_{(2,1)}$ formed on the waveguide substrate $W_2$ have different grating structure features; and the coupling-in gratings $G_{(2,2)}$ and $G_{(3,1)}$ formed on the waveguide substrate $W_3$ have different grating structure features. This is conducive to adjusting the diffraction efficiency of the coupling-in grating for different dominant wavelengths to improve light utilization efficiency and the uniformity of display brightness.

According to a preferred embodiment of the present disclosure, under the condition that $\lambda_1/d_1$, $\lambda_2/d_2$, and $\lambda_3/d_3$ are approximately equal and approximately a constant $C_1$, and $\lambda_1/d_2$, $\lambda_2/d_3$, and $\lambda_3/d_4$ are approximately equal and approximately a constant $C_2$, the coupling-in gratings formed on different waveguide substrates for the same dominant wavelength can have a grating structure that is proportional to its grating period. As an example only and not a limitation, as shown in FIG. 7, the grating structure of the coupling-in grating $G_{(1,1)}$ and the grating structure of the coupling-in grating $G_{(1,2)}$ can have similar cross-sections (for example, have the same or similar duty cycle, blaze angle), and the ratio between their sizes (for example, the depth and height of the grating) can be approximately the ratio between the grating periods $d_1$ and $d_2$; the relationship between the grating structures of the coupling-in grating $G_{(2,1)}$ and the coupling-in grating $G_{(2,2)}$ and the relationship between the grating structures of the coupling-in grating $G_{(3,1)}$ and the coupling-in grating $G_{(3,2)}$ are the same as the relationship between the grating structures of the coupling-in grating $G_{(1,1)}$ and the coupling-in grating $G_{(1,2)}$ described above, and will not be repeated here. Such a near-eye display waveguide device can not only expand the field of view angle range, optimize the diffraction efficiency, and improve the color uniformity, but also greatly simplify the grating design.

An example of the near-eye display waveguide device according to the embodiment of the present disclosure is introduced above with reference to FIGS. 3 to 7, namely, the near-eye display waveguide device 100, which comprises four waveguide substrates stacked on each other for receiving image-carrying light comprising three dominant wavelengths to achieve a large field of view and color display. However, it should be understood that the number of the above waveguide substrates and the number of dominant wavelengths are only exemplary and not restrictive.

Figure 8:
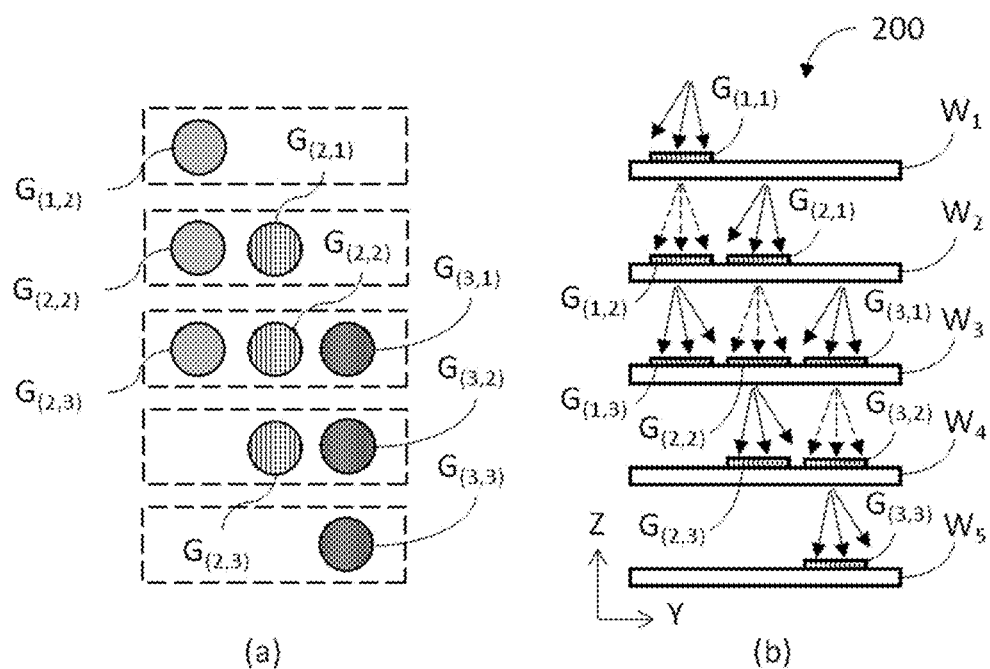
FIG. 8 schematically shows another example of a near-eye display waveguide device according to embodiments of the present disclosure and the arrangement of its coupling-in gratings.

For ease of understanding, FIG. 8 schematically shows another example of a near-eye display waveguide device according to embodiments of the present disclosure (a near-eye display waveguide device 200) and the arrangement of its coupling-in gratings. The near-eye display waveguide device 200 comprises five waveguide substrates $W_1$, $W_2$, $W_3$, $W_4$, and $W_5$ stacked on each other for receiving image-carrying light comprising three dominant wavelengths $\lambda_1$, $\lambda_2$, and $\lambda_3$ and performing near-eye image display. Similar to the near-eye display waveguide device 100, each waveguide substrate of the near-eye display waveguide device 200 can be formed with a coupling-out grating and at least one coupling-in grating (see FIG. 3). For the sake of simplicity, a top view of the waveguide device 200 is not shown in FIG. 8. Graph (a) in FIG. 8 shows the arrangement of each coupling-in gratings on the waveguide substrates $W_1$, $W_2$, $W_3$, $W_4$, and $W_5$ in order from top to bottom in a top view; and Graph (b) in FIG. 8 shows the arrangement of the coupling-in gratings in a side view observed along the X direction (the same grating vector direction of each coupling-in grating).

As shown in FIG. 8, the coupling-in gratings $G_{(1,1)}$, $G_{(1,2)}$, and $G_{(1,3)}$ for the dominant wavelength $\lambda_1$ are respectively formed on adjacent waveguide substrates $W_1$, $W_2$, and $W_3$, and their projections in the Z direction perpendicular to the waveguide substrates overlap with each other; similarly, the coupling-in gratings $G_{(2,1)}$, $G_{(2,2)}$, and $G_{(2,3)}$ for the dominant wavelength $\lambda_2$ are respectively formed on adjacent waveguide substrates $W_2$, $W_3$, and $W_4$, and their projections in the Z direction overlap with each other; the coupling-in gratings $G_{(3,1)}$, $G_{(3,2)}$, and $G_{(3,3)}$ for the dominant wavelength $\lambda_3$ are respectively formed on adjacent waveguide substrates $W_3$, $W_4$, and $W_5$, and their projections in the Z direction overlap with each other.

Figure 9:
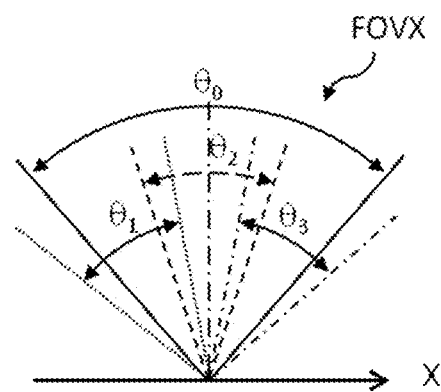
FIG. 9 schematically shows an exemplary relationship between the coupling-in field of view angle range of three coupling-in gratings for the same dominant wavelength in a near-eye display waveguide device according to other embodiments of the present disclosure and the image field of view angle range of the image-carrying light projected by a light engin.

FIG. 9 schematically shows an exemplary relationship between the coupling-in field of view angle range of three coupling-in gratings for the same dominant wavelength in a near-eye display waveguide device according to other embodiments of the present disclosure and the image field of view angle range of the image carrying light projected by a light engin. The near-eye display waveguide device 200 shown in FIG. 8 is configured such that the coupling-in field of view angle ranges $\theta_1$, $\theta_2$, $\theta_3$ of the three coupling-in gratings (for example, coupling-in gratings $G_{(1,1)}$, $G_{(1,2)}$, $G_{(1,3)}$) for the same dominant wavelength and the image field of view angle range $\theta_0$ of the image-carrying light projected by the light engin conform to the relationship shown in FIG. 9, that is, the coupling-in field of view angle ranges $\theta_1$, $\theta_2$, $\theta_3$ are each smaller than the image field of view angle range $\theta_0$, but cover the image field of view angle range $\theta_0$ as a whole.

The near-eye display waveguide device 200 can have other features of the near-eye display waveguide device 100 described above with reference to FIGS. 3 to 7, which will not be described in detail here.

It can be seen that the number of waveguide substrates and dominant wavelengths in the near-eye display waveguide device according to the embodiment of the present disclosure can have various different situations. In summary, the m (m>3) waveguide substrates of the near-eye display waveguide device according to the embodiment of the present disclosure are waveguide substrates $W_i$, i is an integer and $1 \leq i \leq m$, wherein:

(1) for i=1, a coupling-in grating $G_{(1,1)}$ for the dominant wavelength $\lambda_1$ is formed on a waveguide substrate $W_1$, and the coupling-in grating $G_{(1,1)}$ has a grating period $d_1$;

(2) for i=m, a coupling-in grating $G_{(m-1,2)}$ for the dominant wavelength $\lambda_{m-1}$ is formed on a waveguide substrate $W_m$, and the coupling-in grating $G_{(m-1,2)}$ has a grating period $d_m$; and (3) for $2 \leq i \leq m-1$, a coupling-in grating $G_{(i,1)}$ for the dominant wavelength $\lambda_i$ and a coupling-in grating $G_{(i-1,2)}$ for the dominant wavelength $\lambda_{i-1}$ are formed on the waveguide substrate $W_i$, and satisfy: $\lambda_{i-1} > \lambda_i > \lambda_{i+1}$.

It should be understood that although only two coupling-in gratings for the same dominant wavelength formed on two waveguide substrates are described above, this does not exclude that more coupling-in gratings for the dominant wavelength can be formed on one or more other waveguide substrates. As an example, reference can be made to the near-eye display waveguide device 200 described above with reference to FIG. 8.

Preferably, for $2 \leq i \leq m-1$, the coupling-in grating $G_{(i,1)}$ and the coupling-in grating $G_{(i-1,2)}$ have the same grating vector direction and grating period $d_i$, and $d_{i-1} > d_i > d_{i+1}$.

Preferably, for $1 \leq i \leq m-1$, it satisfies: $\lambda_i/d_i$ is approximately a constant $C_1$, and/or $\lambda_i/d_{i+1}$ is approximately a constant $C_2$, wherein a deviation is within ±5%.

Figure 10:
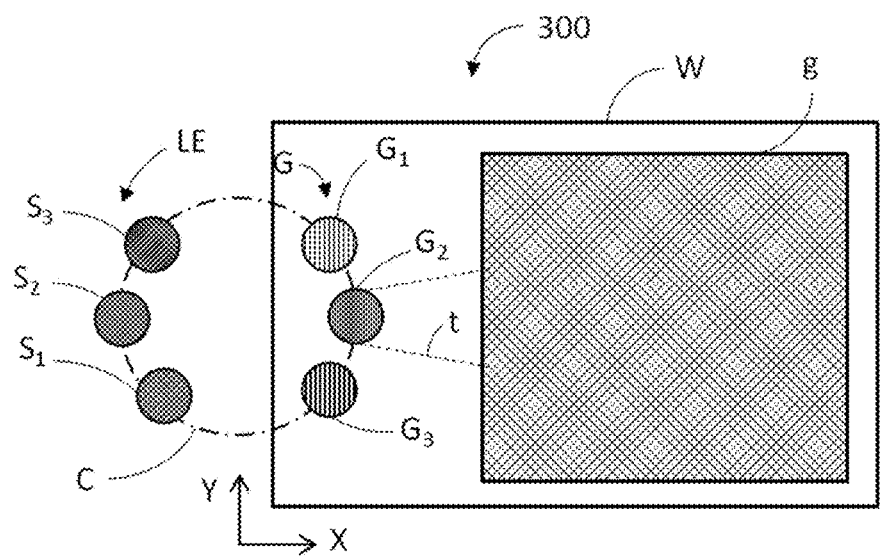
FIG. 10 is a top view of another example of a near-eye display waveguide device according to embodiments of the present disclosure.

FIG. 10 is a top view of another example of a near-eye display waveguide device according to embodiments of the present disclosure, wherein a plurality of waveguide substrates W stacked on each other in the near-eye display waveguide device and coupling-in gratings G and a coupling-out grating g formed thereon are shown in a manner that their projections on the top surface (located in the X-Y plane) of the waveguide device in a direction perpendicular to the waveguide substrate (Z direction) are stacked on each other.

A near-eye display waveguide device 300 shown in FIG. 10 has a configuration substantially the same as the near-eye display waveguide device 100 described above with reference to FIGS. 3 to 7, except that: in the near-eye display waveguide device 100, the coupling-in gratings $G_1$, $G_2$, $G_3$ for different dominant wavelengths $\lambda_1$, $\lambda_2$, $\lambda_3$ are arranged in a straight line perpendicular to their common grating vector direction (X direction), while in the near-eye display waveguide device 300, the coupling-in gratings $G_1$, $G_2$, $G_3$ are arranged on a circular circumference C, which is determined by the positions of light sources $S_1$, $S_2$, $S_3$ for projecting the dominant wavelengths $\lambda_1$, $\lambda_2$, $\lambda_3$ in a reflective light engin LE to be used in combination with the near-eye display waveguide device 300. In other words, the coupling-in gratings $G_1$, $G_2$, $G_3$ and the light sources $S_1$, $S_2$, and $S_3$ are arranged on the same circumference.

Figure 11:
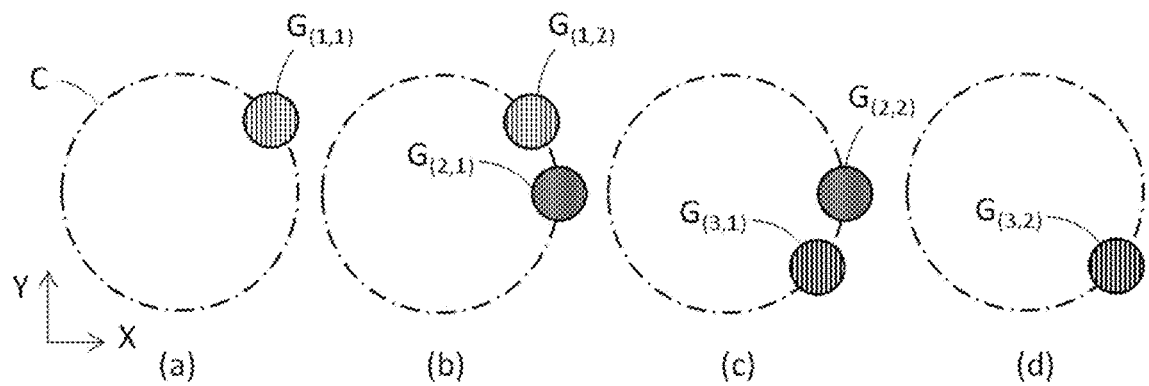
FIG. 11 schematically shows an arrangement of coupling-in gratings in the near-eye display waveguide device shown in FIG. 10.

FIG. 11 schematically shows an exemplary arrangement of coupling-in gratings in the near-eye display waveguide device 300, wherein Graph (a), (b), (c), and (d) respectively show the arrangement of the respective coupling-in gratings on the waveguide substrates $W_1$, $W_2$, $W_3$, and $W_4$.

The near-eye display waveguide device 300 can have other features similar to those of the near-eye display waveguide device 100 described above with reference to FIGS. 3 to 7, which will not be described in detail herein.

It should be understood that the near-eye display waveguide device 300 shown in FIG. 10 can also be constructed to have a configuration substantially the same as the near-eye display waveguide device 200 described above with reference to FIGS. 8 and 9, which will not be described in detail herein.

In the examples of the near-eye display waveguide device according to the embodiments of the present disclosure described above with reference to FIGS. 3 to 11, the coupling-in gratings G have the same grating vector direction (X direction). However, it should be understood that the present invention is not limited in this respect. That is, according to some other embodiments of the present invention, the coupling-in gratings in the near-eye display waveguide device can have different grating vector directions.

Figure 12:
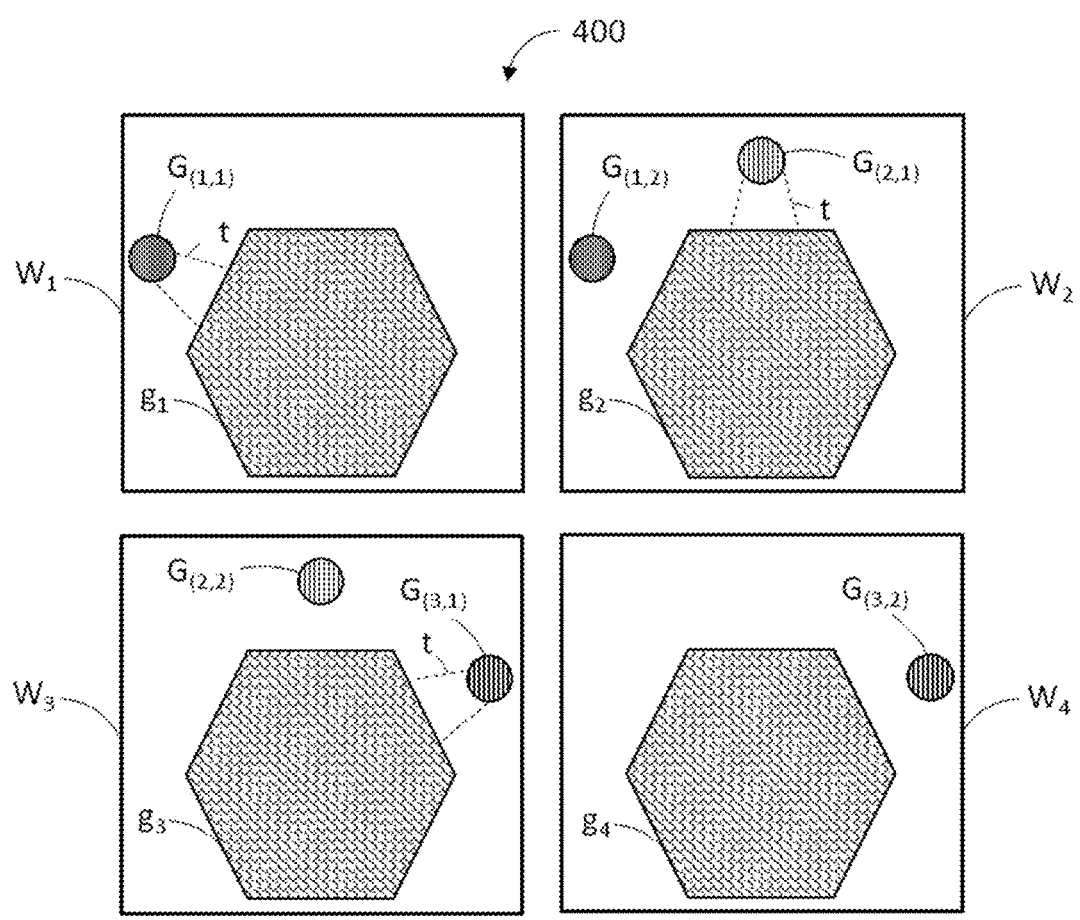
FIG. 12 is a top view of another example of a near-eye display waveguide device according to embodiments of the present disclosure, showing an arrangement of coupling-in gratings relative to coupling-out gratings.

For ease of understanding, FIG. 12 shows a top view of yet another example of a near-eye display waveguide device according to embodiments of the present disclosure. A near-eye display waveguide device 400 shown in FIG. 12 comprises four waveguide substrates $W_1$, $W_2$, $W_3$, and $W_4$ stacked on each other, which receive image-carrying light comprising three dominant wavelengths $\lambda_1$, $\lambda_2$, and $\lambda_3$, and expand the pupil through the corresponding coupling-out gratings $g_1$, $g_2$, $g_3$, and $g_4$ formed thereon and couple the light out of the waveguide substrate to realize image display, wherein the waveguide substrate $W_1$ is formed with a coupling-in grating $G_{(1,1)}$ for the dominant wavelength $\lambda_1$; the waveguide substrate $W_2$ is formed with a coupling-in grating $G_{(2,1)}$ for the dominant wavelength $\lambda_2$ and a coupling-in grating $G_{(1,2)}$ for the dominant wavelength $\lambda_1$; the waveguide substrate $W_3$ is formed with a coupling-in grating $G_{(3,1)}$ for the dominant wavelength $\lambda_3$ and a coupling-in grating $G_{(2,2)}$ for the dominant wavelength $\lambda_2$; the waveguide substrate $W_4$ is formed with a coupling-in grating $G_{(3,2)}$ for the dominant wavelength $\lambda_3$.

In order to propagate the light coupled into the waveguide substrate from the coupling-in grating to the coupling-out grating, in the near-eye display waveguide device 400 shown in FIG. 12, the coupling-in gratings $G_{(1,1)}$ and $G_{(1,2)}$ for the dominant wavelength $\lambda_1$ have a grating vector direction pointing from the upper left to the coupling-out grating $g_1$, the coupling-in gratings $G_{(2,1)}$ and $G_{(2,2)}$ for the dominant wavelength $\lambda_2$ have a grating vector direction pointing from the upper right to the coupling-out grating $g_2$, and the coupling-in gratings $G_{(3,1)}$ and $G_{(3,2)}$ for the dominant wavelength $\lambda_1$ have a grating vector direction pointing from the upper right to the coupling-out grating $g_3$. It can be seen that the coupling-in gratings for different dominant wavelengths in the near-eye display waveguide device 400 have different grating vector directions. From the perspective of a single waveguide substrate, according to some embodiments of the present disclosure, the coupling-in gratings formed on the same waveguide substrate can have different grating vector directions and can be set at different orientations relative to the coupling-out gratings on the waveguide substrate.

In addition to the features regarding the grating vector direction of the coupling-in grating described above with reference to FIG. 12, the near-eye display waveguide device 400 can have other features similar to the near-eye display waveguide devices 100 and 200 described above with reference to FIGS. 3 to 9, which will not be described in detail herein.

The technical effect of the near-eye display waveguide device according to the embodiment of the present disclosure will be described below through data examples.

In the following data examples, the field of view angle is represented by (FOVX, FOVY), where the field of view angle FOVX is the angle formed by the incident light relative to the normal line (Z axis, see FIGS. 3 and 8) of the X-Y plane (see FIG. 1) where the coupling-in grating is located in the direction around the Y axis, and the field of view angle FOVY is the angle formed by the incident light relative to the normal line in the direction around the X axis, and the X axis is the direction parallel to the grating vector of the coupling-in grating.

Data Example 1

A near-eye display waveguide device used in Data Example 1 has the structure of the near-eye display waveguide device 100 shown in FIGS. 3 and 4 and is used to cooperate with a light engin that projects image-carrying light with dominant wavelengths $\lambda_1$=624 nm (red light), $\lambda_2$=522 nm (green light), and $\lambda_3$=455 nm (blue light). The image field of view angle range of the image-carrying light projected by the light engin is $\theta_0$, $\theta_0$=(−26:26°, −15:15°).

In the near-eye display waveguide device of Data Example 1:
(1) The waveguide substrates $W_1$, $W_2$, $W_3$, and W4 are made of the same glass material and have substantially the same refractive index n=1.7 for the dominant wavelengths $\lambda_1$, $\lambda_2$, and $\lambda_3$.
(2) The coupling-in grating $G_{(1,1)}$ on the waveguide substrate $W_1$ is used to couple in red light with a dominant wavelength $\lambda_1$=624 nm and has a grating period $d_1$=508 nm.
(3) The coupling-in gratings $G_{(1,2)}$ and $G_{(2,1)}$ on the waveguide substrate $W_2$ are used to couple in red light with a dominant wavelength $\lambda_1$=624 nm and green light with a dominant wavelength $\lambda_2$=522 nm, respectively. They have the same grating period $d_2$=425 nm and are arranged at intervals in the Y direction, and the projections of the coupling-in gratings $G_{(1,1)}$ and $G_{(1,2)}$ in the Z direction substantially overlap.
(4) The coupling-in gratings $G_{(2,2)}$ and $G_{(3,1)}$ on the waveguide substrate $W_3$ are used to couple in green light with a dominant wavelength $\lambda_2$=522 nm and blue light with a dominant wavelength $\lambda_3$=455 nm, respectively. They have the same grating period $d_3$=370 nm and are arranged at intervals in the Y direction, and the projections of the coupling-in grating $G_{(2,1)}$ and the coupling-in grating $G_{(2,2)}$ in the Z direction substantially overlap.
(5) The coupling-in grating $G_{(2,2)}$ on the waveguide substrate $W_4$ is used to couple in blue light with a dominant wavelength of $\lambda_3$=455 nm and has a period $d_4$=322 nm, and the projections of the coupling-in grating $G_{(3,1)}$ and the coupling-in grating $G_{(3,2)}$ in the Z direction substantially overlap.
(6) The image-carrying light is incident from one side of the waveguide substrate $W_4$, and the coupling-in gratings G are all located on the side of the corresponding waveguide substrates opposite to the incident side of the image-carrying light.

Based on the above parameters, the coupling-in field of view angle range of each coupling-in grating is calculated according to the light beam wave vector space as follows:

the coupling-in grating $G_{(1,1)}$ has an available field of view angle range $\theta_{r1}=(-13:27°, -16:16°)$;

the coupling-in grating $G_{(1,2)}$ has an available field of view angle range $\theta_{r2}=(-28:13°, -16:16°)$;

the coupling-in grating $G_{(2,1)}$ has an available field of view angle range $\theta_{g1}=(-13:27°, -16:16°)$;

the coupling-in grating $G_{(2,2)}$ has an available field of view angle range $\theta_{g2}=(-28:13°, -16:16°)$;

the coupling-in grating $G_{(3,1)}$ has an available field of view angle range $\theta_{b1}=(-13:27°, -16:16°)$; and the coupling-in grating $G_{(3,2)}$ has an available field of view angle range $\theta_{b2}=(-28:13°, -16:16°)$.

It can be seen that the coupling-in field of view angle ranges $\theta_{r1}$, $\theta_{r2}$, $\theta_{g1}$, $\theta_{g2}$, $\theta_{b1}$, and $\theta_{b2}$ of the coupling-in grating in the near-eye display waveguide of data example 1 are each smaller than the image field of view angle range $\theta_0$. However, the coupling-in field of view angle ranges $\theta_{r1}+\theta_{r2}$, $\theta_{g1}+\theta_{g2}$, $\theta_{b1}+\theta_{b2}$ of the coupling-in grating for the same dominant wavelength can cover the image field of view angle range $\theta_0$ as a whole.

By designing the diffraction efficiency curve of the coupling-in grating, each coupling-in grating G can be used to couple the image-carrying light within the following field of view angle ranges:

the coupling-in gratings $G_{(1,1)}$, $G_{(2,1)}$, and $G_{(3,1)}$ are used to couple in the red light, green light, and blue light within the field of view angle range $\theta_1=(-12:26°, -15:15°)$;

the coupling gratings $G_{(1,2)}$, $G_{(2,2)}$, and $G_{(3,2)}$ are used to couple in the red light, green light, and blue light within the field of view angle range $\theta_2=(-26:12°, -15:15°)$.

That is, the near-eye display waveguide device of Data Example 1 can support the coupling-in and total reflection transmission of full-color white light within the field of view angle range of 52°×30°, and the diagonal viewing angle reaches 58°.

In addition, in the near-eye display waveguide device of Data Example 1: $\lambda_1/d_1=1.228$, $\lambda_2/d_2=1.228$, $\lambda_3/d_3=1.230$, which are approximately a constant 1.228, and the deviation is within 1%; $\lambda_1/d_2=1.468$, $\lambda_2/d_3=1.411$, $\lambda_3/d_4=1.403$, which are approximately a constant 1.411, and the deviation is within 5%.

When the refractive index of each waveguide substrate is basically the same and the ratio of wavelength to grating period is approximately constant, the diffraction efficiency of each coupling-in grating is very close; on this basis, by controlling the grating structure parameters of each waveguide substrate, such as depth, duty cycle, coating, etc., further fine-tuning and optimization are performed, and finally an output result with high color uniformity is obtained, where the color deviation value $\Delta u'v'<0.03$. The color deviation value of the traditional design method is about 0.1. The color deviation value is defined as the maximum color difference between any two points in the CIE1976 (u', v') color coordinate space. The smaller the value, the higher the color uniformity. The expression of the color deviation value $\Delta u'v'$ is as follows:

$$\Delta u'v' = \max\left(\sqrt{(u'_i - u'_j)^2 + (v'_i - v'_j)^2}\right)$$

wherein $(u'_i, v'_i)$, $(u'_j, v'_j)$ are the color coordinates of the i, j field of view areas of the output result, i, j=1, 2 ... n, where n is the total number of divided filed of view areas of the output result.

Data Example 2

A near-eye display waveguide device used in Data Example 2 has the structure of the near-eye display waveguide device 300 shown in FIGS. 10 and 11 and is used to cooperate with an off-axis light engin. The light engin projects image-carrying light with dominant wavelengths $\lambda_1=622$ nm (red light), $\lambda_2=532$ nm (green light), and $\lambda_3=455$ nm (blue light), and the image field of view angle range of the image-carrying light is $\theta_0=(-35:35°, -22:22°)$.

In the near-eye display waveguide device of Data Example 2:

(1) The waveguide substrates $W_1$, $W_2$, $W_3$, and W4 are made of the same glass material and have refractive indices $n_1=1.93$, $n_2=1.96$, and $n_3=2.00$ for the dominant wavelengths $\lambda_1$, $\lambda_2$, and $\lambda_3$ respectively.

(2) The coupling-in grating $G_{(1,1)}$ on the waveguide substrate $W_1$ is used to couple in red light with a dominant wavelength $\lambda_1=622$ nm and has a grating period $d_1=462$ nm.

(3) The coupling-in gratings $G_{(1,2)}$ and $G_{(2,1)}$ on the waveguide substrate $W_2$ are used to couple in red light with a dominant wavelength $\lambda_1=622$ nm and green light with a dominant wavelength $\lambda_2=532$ nm, respectively. They have the same grating period $d_2=395$ nm and are arranged at intervals in the Y direction, and the projections of the coupling-in gratings $G_{(1,1)}$ and $G_{(1,2)}$ in the Z direction substantially overlap.

(4) The coupling-in gratings $G_{(2,2)}$ and $G_{(3,1)}$ on the waveguide substrate $W_3$ are used to couple in green light with a dominant wavelength $\lambda_2=532$ nm and blue light with a dominant wavelength $\lambda_3=455$ nm, respectively. They have the same grating period $d_3=338$ nm and are arranged at intervals in the Y direction, and the projections of the coupling-in grating $G_{(2,1)}$ and the coupling-in grating $G_{(2,2)}$ in the Z direction substantially overlap.

(5) The coupling-in grating $G_{(2,2)}$ on the waveguide substrate $W_4$ is used to couple in blue light with a dominant wavelength of $\lambda_3=455$ nm and has a period $d_4=289$ nm, and the projections of the coupling-in gratings $G_{(3,1)}$ and $G_{(3,2)}$ in the Z direction substantially overlap.

(6) The projections of the coupling-in gratings G in the Z direction perpendicular to the waveguide substrate W are arranged on a circle, so that they are symmetrical with the red, green and blue light sources of the off-axis light engin about the center of the circle.

(7) The image-carrying light is incident from one side of the waveguide substrate $W_1$, and the coupling-in gratings G are all located on the image-carrying light incident side of the corresponding waveguide substrate.

Based on the above parameters, the coupling-in field of view angle range of each coupling-in grating is calculated according to the light beam wave vector space as follows:

the coupling-in grating $G_{(1,1)}$ has an available field of view angle range $\theta_{r1}=(-20:36°, -26:26°)$;

the coupling-in grating $G_{(1,2)}$ has an available field of view angle range $\theta_{r2}=(-35:20°, -26:26°)$;

the coupling-in grating $G_{(2,1)}$ has an available field of view angle range $\theta_{g1}=(-20:38°, -27:27°)$;

the coupling-in grating $G_{(2,2)}$ has an available field of view angle range $\theta_{g2}=(-35:22°, -27:27°)$;

the coupling-in grating $G_{(3,1)}$ has an available field of view angle range $\theta_{b1}=(-20:40°, -28:28°)$;

the coupling-in grating $G_{(3,2)}$ has an available field of view angle range $\theta_{b2}=(-35:24°, -28:28°)$.

It can be seen that the coupling-in field of view angle ranges $\theta_{r1}$, $\theta_{r2}$, $\theta_{g1}$, $\theta_{g2}$, $\theta_{b1}$, and $\theta_{b2}$ of the coupling-in grating in the near-eye display waveguide of data example 2 are each smaller than the image field of view angle range $\theta_0$. However, the coupling-in field of view angle ranges $\theta_{r1}+\theta_{r2}$, $\theta_{g1}+\theta_{g2}$, $\theta_{b1}+\theta_{b2}$ of the coupling-in grating for the same dominant wavelength can cover the image field of view angle range $\theta_0$ as a whole.

By designing the diffraction efficiency curve of the coupling-in grating, each coupling-in grating G can be used to couple the image-carrying light within the following field of view angle ranges:

the coupling-in gratings $G_{(1,1)}$, $G_{(2,1)}$, and $G_{(3,1)}$ are used to couple in the red light, green light, and blue light within the field of view angle range $\theta_1=(-18:35°, -22:22°)$;

the coupling-in gratings $G_{(1,2)}$, $G_{(2,2)}$, and $G_{(3,2)}$ are used to couple in the red light, green light, and blue light within the field of view angle range $\theta_2=(-35:18°, -22:22°)$.

That is, the near-eye display waveguide device of Data Example 2 can support the coupling-in and total reflection transmission of full-color white light within the field of view angle range of 70°×44°, and the diagonal viewing angle reaches 80°.

In addition, in the near-eye display waveguide device of Data Example 2:

$\lambda_1/d_1=1.346$, $\lambda_2/d_2=1.347$, $\lambda_3/d_3=1.346$, which are approximately a constant 1.346, and the deviation is within 1%; $\lambda_1/d_2=1.575$, $\lambda_2/d_3=1.574$, $\lambda_3/d_4=1.574$, which are approximately a constant 1.574, and the deviation is within 1%.

When the refractive index of each waveguide substrate is basically the same and the ratio of wavelength to grating period is approximately constant, the diffraction efficiency of each coupling-in grating is very close; on this basis, by controlling the grating structure parameters of each waveguide substrate, such as depth, duty cycle, coating, etc., further fine-tuning and optimization are performed, and finally an output result with high color uniformity is obtained, where the color deviation value $\Delta u'v'<0.03$. The color deviation value of the traditional design method is about 0.15.

The near-eye display waveguide device according to embodiments of the present disclosure can be applied to a near-eye display apparatus. Such a near-eye display apparatus comprises a lens and a frame for holding the lens close to the eye, wherein the lens can comprise the near-eye display waveguide device according to embodiments of the present disclosure as described above. Preferably, the display apparatus is an augmented reality display apparatus or a virtual reality display apparatus.

The above description is merely an illustration of the preferred embodiments of the present application and the applied technical principles. Those skilled in the art should understand that the scope of the disclosure involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. A near-eye display waveguide device, comprising m waveguide substrates stacked on each other, m being an integer and m>3, the near-eye display waveguide device receiving image-carrying light with an image field of view angle range, and the image-carrying light comprising light of less than m dominant wavelengths, wherein:

corresponding to each dominant wavelength, the m waveguide substrates are formed with at least two coupling-in gratings, the at least two coupling-in gratings are formed on different waveguide substrates and have different grating periods, for being used to couple light in different coupling-in field of view angle ranges into the corresponding waveguide substrates, wherein the coupling-in field of view angle ranges are each smaller than the image field of view angle range, and the coupling-in field of view angle ranges as a whole cover the image field of view angle range;

the m waveguide substrates are waveguide substrates $W_i$, i is an integer and 1≤i'm, wherein, for i=1, a coupling-in grating $G_{(1,1)}$ for a dominant wavelength $\lambda_1$ is formed on a waveguide substrate $W_1$, and the coupling-in grating $G_{(1,1)}$ has a grating period $d_1$;

for i=m, a coupling-in grating $G_{(m-1,2)}$ for a dominant wavelength $A_{m-1}$ is formed on a waveguide substrate $W_m$, and the coupling-in grating $G_{(m-1,2)}$ has a grating period $d_m$; and for 2≤i≤m−1, a coupling-in grating $G_{(i,1)}$ for a dominant wavelength $A_i$ and a coupling-in grating $G_{(i-1,2)}$ for the dominant wavelength $\lambda_{i-1}$ are formed on the waveguide substrate $W_i$, and satisfy: $\lambda_i$-1>$\lambda_i$>$\lambda_{i+1}$, wherein, for 2≤i≤m−1, the coupling-in grating $G_{(i,1)}$ and the coupling-in grating $G_{(i-1,2)}$ have different grating structure features, and the grating structure features comprise one or more of depth, height, duty cycle, blaze angle and optical coating of the gratings;

wherein, for 2≤i≤m−1, the coupling-in grating $G_{(i,1)}$ and the coupling-in grating $G_{(i-1,2)}$ have the same grating vector direction and grating period $d_i$, and $d_{i-1}>d_i>d_{i+1}$, and wherein, for 1≤i≤m−1: $\lambda_i/d_i$ is approximately a constant $C_1$, and/or $A_i/d_i+1$ is approximately a constant $C_2$, wherein a deviation is within ±5%.

2. The near-eye display waveguide device of claim 1, wherein each waveguide substrate is formed with a coupling-out grating and at least one coupling-in grating;

after being coupled into a waveguide substrate through a corresponding coupling-in grating, the image-carrying light of each dominant wavelength propagates to the coupling-out grating of the waveguide substrate through a total reflection path corresponding to the coupling-in grating; and the total reflection path corresponding to a coupling-in grating for coupling light of one dominant wavelength does not pass through a coupling-in grating for coupling light of another dominant wavelength.

3. The near-eye display waveguide device of claim 1, wherein the coupling-in gratings formed on the m waveguide substrates have the same grating vector direction; and the coupling-in gratings formed on the m waveguide substrates for coupling light of different dominant wavelengths are separated from each other in a direction parallel to each waveguide substrate and perpendicular to the grating vector direction.

4. The near-eye display waveguide device of claim 1, wherein the projections of the at least two coupling-in gratings formed on different waveguide substrates for coupling light of the same dominant wavelength overlap each other in a direction perpendicular to the waveguide substrate.

5. The near-eye display waveguide device of claim 4, wherein at least two coupling-in gratings are formed on adjacent waveguide substrates.

6. The near-eye display waveguide device of claim 1, wherein m=4, and the image-carrying light comprises red, green, and blue light.

7. The near-eye display waveguide device of claim 1, wherein the m waveguide substrates are made of materials with the same or similar refractive index.

8. The near-eye display waveguide device of claim 1, wherein, for $1 \le i \le m-1$, j is an integer and $1 \le j \le m-1$, k=1 or 2, and $i \ne j$, a coupling-in grating $G_{(i,k)}$ and a coupling-in grating $G_{(j,k)}$ are separated from each other in a direction perpendicular to the waveguide substrates.

9. The near-eye display waveguide device of claim 1, wherein, for $1 \le i \le m-1$, the projections of the coupling-in grating $G_{(i,1)}$ and the coupling-in grating $G_{(i,2)}$ overlap each other in a direction perpendicular to the waveguide substrates.

10. The near-eye display waveguide device of claim 9, wherein the coupling-in grating $G_{(i,1)}$ and the coupling-in grating $G_{(i,2)}$ are formed on adjacent waveguide substrates.

11. A near-eye display apparatus, comprising the near-eye display waveguide device of claim 1.

12. The near-eye display apparatus of claim 11, wherein the near-eye display device further comprises a lens and a frame for holding the lens close to eye, and the lens comprises the near-eye display waveguide device.

* * * * *